United States Patent [19]

Bergner

[11] Patent Number: 4,648,473

[45] Date of Patent: Mar. 10, 1987

[54] SPEED CONTROL FOR AN ELECTRIC GOLF CAR

[75] Inventor: William J. Bergner, Memphis, Tenn.

[73] Assignee: Columbia Parcar Corporation, Deerfield, Ill.

[21] Appl. No.: 731,946

[22] Filed: May 8, 1985

[51] Int. Cl.⁴ .............................................. B60K 1/00
[52] U.S. Cl. .................................... 180/65.8; 318/301
[58] Field of Search ........................... 180/65.1, 65.8; 318/139, 301, 305

[56] References Cited

U.S. PATENT DOCUMENTS

| | | | |
|---|---|---|---|
| 2,267,381 | 12/1941 | Ulinski | 318/305 |
| 2,716,768 | 2/1973 | Mason | 318/139 |
| 2,747,046 | 5/1956 | Mekelberg | 335/60 |
| 2,813,240 | 11/1957 | Arnot | 318/262 |
| 3,188,543 | 6/1965 | Colvill et al. | 318/139 |
| 3,764,870 | 10/1973 | Morton et al. | 318/139 |
| 3,809,978 | 5/1974 | Zubris | 318/139 |
| 3,818,293 | 6/1974 | Wood et al. | 318/139 |
| 3,912,978 | 10/1975 | Poole | 361/58 |
| 4,047,145 | 9/1977 | Schwehr | 335/206 |
| 4,365,189 | 12/1982 | Hawkins et al. | 180/65.8 |
| 4,389,627 | 6/1983 | Uesugi et al. | 180/65.1 |
| 4,563,621 | 1/1986 | Moore | 318/139 |

Primary Examiner—David M. Mitchell
Assistant Examiner—Richard Camby
Attorney, Agent, or Firm—Allegretti, Newitt, Witcoff & McAndrews, Ltd.

[57] ABSTRACT

A speed control for an electric golf car providing sequential changing between a plurality of speeds such that the golf car must accelerate through fixed speeds for predetermined times prior to reaching a full speed. A foot pedal actuable by the operator controls a plurality of magnetic reed switches. The reed switches in turn control a timing circuit for generating a plurality of motor drive signals in succession at predetermined times. The motor drive signals actuate relay coils for applying power to the golf car motor.

5 Claims, 3 Drawing Figures

SPEED CONTROL FOR AN ELECTRIC GOLF CAR

BACKGROUND OF THE INVENTION

1. Field of the Invention

The invention relates to a speed control for an electric powered golf car, and more specifically relates to a control for smoothly starting the traction motor of a golf car by poviding time delayed power to the car motor. More particularly, the invention relates to a speed control which prevents directional movement changes (forward, reverse) at high speeds by automatically requiring the car to restart at its lowest speed.

2. Description of Related Art

Speed control devices for electric golf cars present certain difficulties during their use, particularly with respect to comfort. The predominate complaint is the inability of the car to ease into motion and thereafter, to accelerate gradually in speed. The driver and possible passenger in the vehicle typically experience lurching movements throughout the ride. Another problem encountered is the extensive maintenance required on the several drive components, i.e., differential, axles, wheel hubs, etc., due to the lurching movement or abrupt changes in speed. The lurching movement particularly occurs where the car is shifted from forward to reverse while driving the car at high speeds.

The prior art discloses various structures for attempting to control the speed of an electric powered vehicle. However, such structures provide various drawbacks and are different than the invention described herein.

For example, U.S. Pat. No. 3,912,978, issued to C. W. Poole on Oct. 14, 1975, describes a speed control for an electric vehicle, in which the speed of the vehicle is regulated by depressing a foot pedal which sequentially closes four switches depending upon the extent of depression of the foot pedal. The switches serve to activate relays for bypassing fixed resistors in order to vary the current flow to the motor for controlling its speed. U.S. Pat. No. 2,747,046, issued to E. F. Mekelberg on May 22, 1956, discloses a speed control for an electric truck in which a foot pedal is connected to a cam shaft which moves at a speed controlled by a dashpot timing assembly. As the cam shaft moves, a plurality of switches are operated to vary the current to the electric motor of the truck. Likewise, U.S. Pat. No. 2,267,381, issued to B. Ulinski on Dec. 23, 1941, discloses a speed control for use with an electric industrial truck. This patent teaches a control in which the operator must put the control in its first speed and keep it there for a short interval prior to going to other speeds. This is accomplished by utilizing a relay which has a slow operation requiring the a circuit to be maintained through a pair of first speed contacts for a predetermined period of time.

SUMMARY OF THE INVENTION

It is therefore an important object of the present invention to provide a speed control device for an electric golf car which improves comfort for the driver and the passenger and reduces maintenance on drive components.

Another object of the present invention is to eliminate solenoid control snap switches and motor current carrying selector type switches by using transistor switching.

A further object is to apply and control power from batteries to the traction motor of a golf car in a smooth and unabruptive manner so as to enhance drive and passenger comfort.

Another further object is to provide for an automatic increase in the speed of the electric golf car for fixed time periods resulting in a smoother ride and less abrupt forward or reversal of direction.

Further purposes and objects of the present invention will appear as the specification proceeds.

With the foregoing and other objects in view the structure described herein provides a speed control circuit for an electric golf car providing sequential changing between a plurality of speeds. The golf car must accelerate through fixed speeds for a predetermined time prior to reaching a full speed.

DETAILED DESCRIPTION OF THE PREFERRED EMBODIMENT

Figure 1:
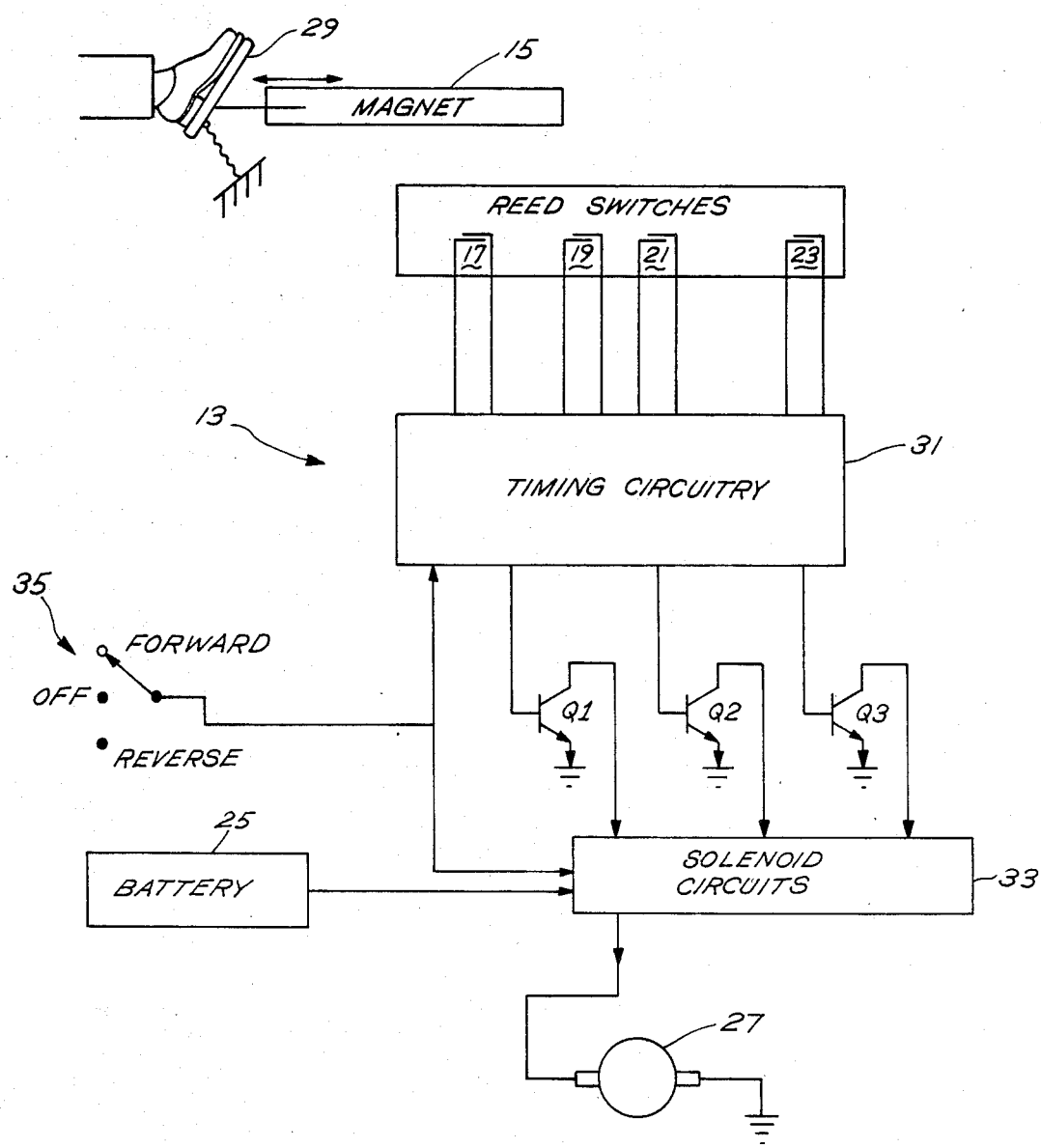
FIG. 1 is a partial block and partial schematic diagram of a preferred embodiment of a speed control for an electric golf car.

Referring to FIG. 1, a speed control 13 for an electric powered golf car (not shown) includes a magnet 15 which is secured to a foot pedal 29 of the golf car. Magnet 15 is arranged for moving in close proximity to a plurality of reed switches 17, 19, 21, 23. The closing of the reed switches by magnet 15 causes application of power from a battery 25 (which may be formed of several batteries) to a traction motor 27. The reed switches are electrically connected to a timing circuitry 31 which controls the actuation of solenoid circuits 33 to provide power to the motor. The solenoid circuits are driven in a sequential fashion by timing circuit 31 in order to apply power to the traction motor in a smoothly increasing manner.

A key switch 35 is positioned within the golf car at a location for operator actuation. Key switch 35 serves to change direction of the car for movement in either a forward or reverse direction. Whenever the key switch is operated, the speed control resets in order to move the car in the new direction beginning in a low speed. This makes direction changes at full speed unabrupt.

As foot pedal 29 is moved downwardly, magnet 15 initially closes first reed switch 17 which commands power to motor 27 for driving the car at a low speed. As the magnet continues to move downwardly, it passes second reed switch 19 which commands more power to motor 27 for driving the car at a second speed, and so on through, for example, four different speeds. The number of reed switches closed depends on how far the foot pedal is depressed. The magnet keeps previously closed switches closed as it moves to the next switch.

Timing circuitry 31 controls the time during which the motor maintains its successive speeds despite how quickly the operator depresses pedal 29. When the driver quickly moves the pedal from its "off" position to a position for actuating the second reed switch 19, the second speed will be energized only after the motor has been powered in its first speed for a predetermined length of time. The time may be, for example, approximately 0.7 sec. Thus, as the pedal is quickly moved to the second speed position, the motor is driven at the first speed for about 0.7 sec. prior to driving the motor at the second speed. If the driver depresses the pedal quickly from the "off" position to a position for actuating the third reed switch 21, the motor will be driven at the third speed only after a delay of about 1.4 sec., i.e., about 0.7 sec. for the first speed plus about 0.7 sec. for the second speed. Similarly, if pedal movement is from "off" to fourth reed switch 23, the fourth speed (fastest speed) will be energized after about 2.1 sec., i.e., about 0.7 sec. delay for the first speed, about 0.7 sec. for the second speed and about 0.7 sec. for the third speed.

Figure 2:
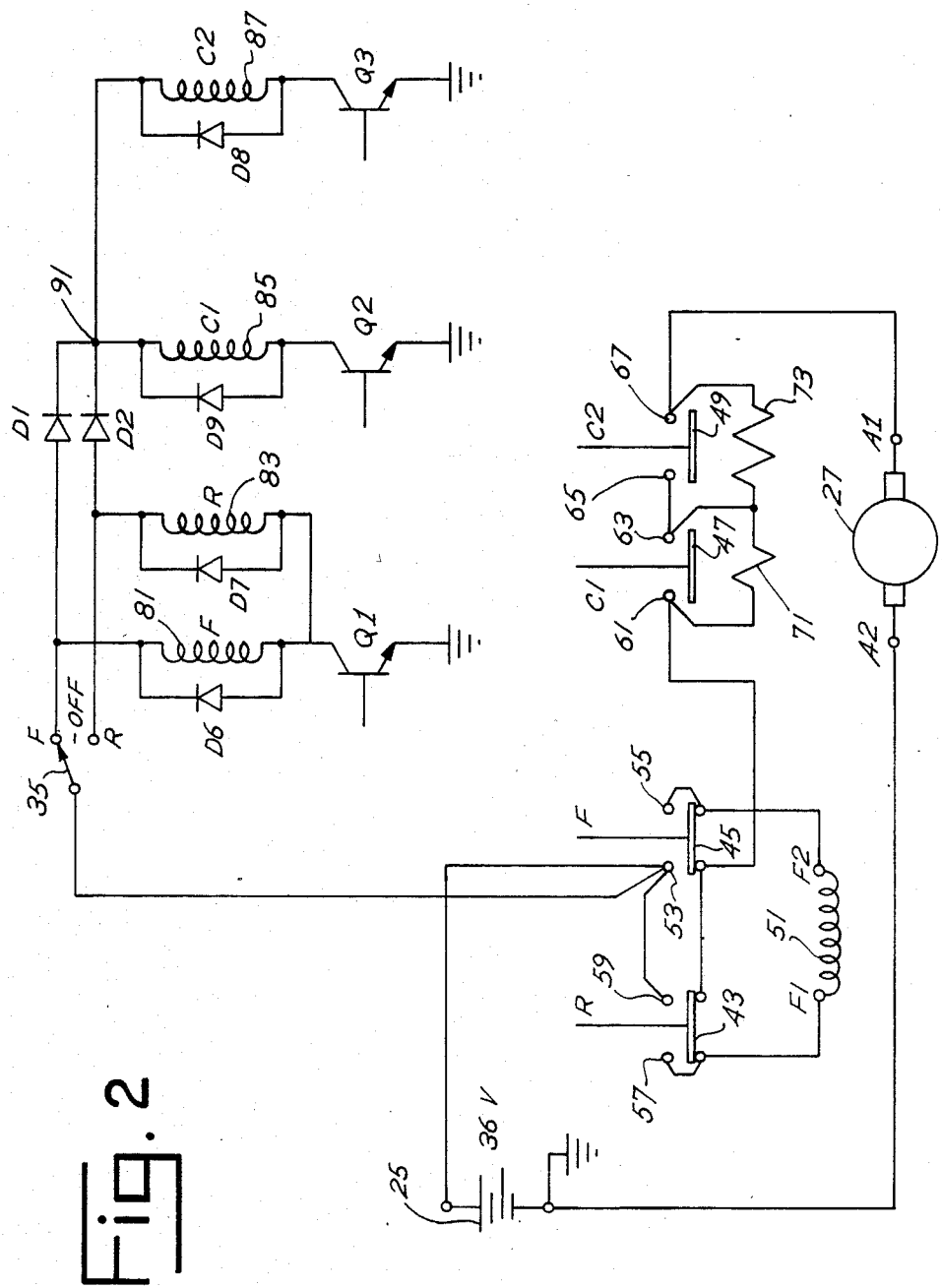
FIG. 2 is a schematic diagram of a solenoid control portion of the speed control of FIG. 1.

Referring to FIG. 2, the grounded terminal of battery 25 is connected to terminal A2 of motor 27. The positive terminal of battery 25 is connectable to terminal A1 of motor 27 via a plurality of solenoid contact wipers 43, 45, 47, 49 and via a motor winding 51. Solenoid contact wipers 43, 45 serve to control the flow of current through coil 51 in order to select a forward direction or a reverse direction of driving for motor 27. When contact wiper 45 is actuated so that it makes contact with switch contacts 53, 55, current passes from node F2 to node F1 of motor winding 51 in order to drive motor 27 in a forward direction. Alternatively, when contact wiper 43 is actuated connecting switch contacts 57, 59, current flows from node F1 to node F2 of motor winding 51 in order to drive motor 27 in a reverse direction.

In a similar fashion, contact wipers 47, 49 may be selectively actuated in order to complete a circuit path between its respective switch contacts 61, 63 and 65, 67. The actuation of contact wipers 47, 49 serve to eliminate either or both of resistances 71, 73 from the current path in order to drive motor 27 at one of four different speeds. As will suggest itself, additional solenoids may be used instead of two as described herein.

The actuation of solenoid wipers 43 through 49 is accomplished by the switching of transistors Q1, Q2, Q3. Transistor Q1 serves to effectively ground solenoid coils 81, 83 upon switching. The grounding of coils 81, 83 serve to move their respective contact wipers 45, 47 to their respective contacts 53, 55, and 57, 59. The positioning of key switch 35 to the F node serves to enable coil 81 whenever transistor Q1 is switched ON. The movement of key switch 35 to the R node serves to enable solenoid coil 83 whenever transistor Q1 is switched ON.

Similarly, solenoid contacts 47, 49 are actuated by solenoid coils 85, 87. The switching of transistors Q2, Q3 serves to ground respective coils 85, 87 for driving respective solenoid contacts 47, 49 for electrical connection of contacts 61, 63 and 65, 67. Diodes D1, D2, D6, D7, D8, D9 are conventional current controlling diodes.

Figure 3:
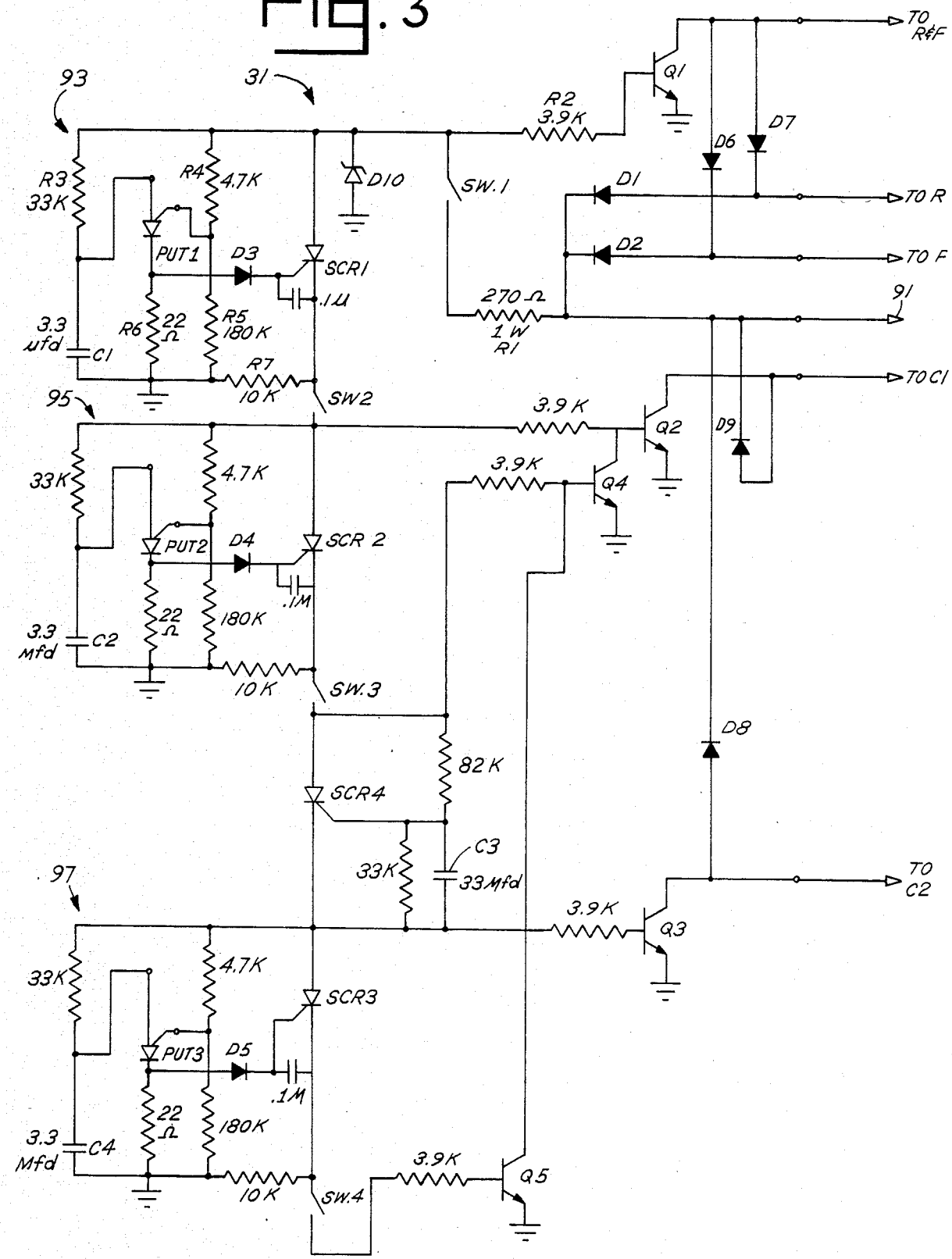
FIG. 3 is a schematic diagram of a timing circuitry portion of the speed control of FIG. 1.

Referring to FIG. 3, timing circuit 31 serves to control the switching of transistors Q1, Q2, Q3 in accordance with the closing of reed switches SW1, SW2, SW3, and SW4. The closing of reed switch SW1 connects battery voltage from circuit node 91 (see FIG. 2) to the base of transistor Q1 via resistors R1 and R2. Transistor Q1 immediately switches ON grounding solenoid coils 81, 83 (FIG. 2) for driving motor 27. Because solenoid coils 85, 87 are not actuated, their respective contact wipers 47, 49 are disconnected from switch contacts 61–67 as shown in FIG. 2. This places resistors 71, 73 in series with motor 27 for driving the motor at its low speed.

Voltage through speed switch SW1 is applied to a timing circuit 93. A zener diode D10 serves as a voltage regulator. Current passes through resistor R3 charging capacitor C1. Capacitor C1 takes approximately 0.7 seconds to charge to a sufficient voltage level to trigger a programmable unijunction transistor PUT1. A pair of resistors R4, R5 provide a threshold voltage level to PUT1 which establishes the voltage at which PUT1 turns ON.

When PUT1 turns ON, current is supplied to the gate of a silicon control rectifier SCR1. This fires SCR1 connecting the voltage across zener diode D10 to reed switch SW2. The firing of PUT1 serves to discharge capacitor C1 to a voltage level close to zero volts. As understood, PUT1 stays ON despite the voltage drop on capacitor C1.

The closing of reed switch SW2 serves to actuate transistor Q2 only if SCR1 has been fired. Thus, transistor Q2 cannot be actuated until 0.7 second time delay after actuation of reed switch SW1. Actuation of transistor Q2 serves to ground solenoid coil 85 (FIG. 2) for removing resistor 71 from the motor circuit to provide more power to motor 27.

Voltage through reed switch SW2 is applied to timing circuit 95 which is similar to timing circuit 93. In like manner, a capacitor C2 is charged after 0.7 second to a voltage sufficient to trigger PUT2 which in turn fires SCR2.

The firing of SCR2 provides a path for current through reed switch SW3. Current through reed switch SW3 switches on transistor Q4 which in turn switches OFF transistor Q2. The turning OFF of transistor Q2 serves to reinsert resistor 71 (FIG. 2) into the motor control circuit.

Voltage through reed switch SW3 also charges a capacitor C3 in order to fire an SCR4 after a relatively small amount of time. Current through SCR4 turns ON transistor Q3 which serves to remove resistor 73 (FIG. 2) from the motor control circuitry.

The use of SCR4 and timing capacitor C3 serves to establish the time at which solenoid coils 85, 87 drop out and pick up, so that the removal of resistor 73 and reinsertion of resistor 71 happen substantially simultaneously. The solenoid coils' times of picking up and dropping out are not equal and may vary by several milliseconds, up to 10 or more milliseconds. Thus, the closing of switch SW3 serves to actuate coil 85 and deactivate coil 87 in a timed manner.

Current through SCR4 passes to a third timing circuit 97 similar to circuits 93, 95. In like manner, after 0.7 seconds capacitor C4 charges to a voltage sufficient to fire SCR3. The firing of SCR3 provides voltage to reed switch SW4 such that actuation of reed switch SW4 enables transistor Q5. Enablement of transistor Q5 serves to turn OFF transistor Q4 which in turn enables transistor Q2. Enablement of transistor Q2 serves to remove resistor 71 from the control circuit. Transistor Q3 continues to be turned ON. The actuation of switch SW4 serves to remove both resistors 71, 73 from the control circuit.

Referring to FIG. 2, when switch 35 is moved between the forward position F and the reverse position R, voltage to node 91 is interrupted. The interruption of voltage at node 91 interrupts the voltage appearing at the anode of SCR1 (FIG. 3). This turns OFF SCR1. The turning OFF of SCR1 in turn interrupts the voltage appearing at the anode of SCR2 turning off SCR2. In a similar manner, SCR3 and SCR4 are also turned OFF.

As key switch 35 completes its movement, voltage is reestablished through switch SW1. However, since capacitor C1 is in a discharged state, capacitor C1 must recharge for approximately 0.7 seconds before power can be supplied through switch SW2. Thus, the switching of key switch 35 when the control circuit is driving motor 27 at its high speed, serves to automatically reapply power to the motor beginning in its low speed and increasing speeds over predetermined times.

In the foregoing, there has been provided a detailed description of a preferred embodiment of the present invention for the purpose of illustration and not limitation. It is to be understood that all modifications, ramifications and equivalence obvious to those having skill in the art based on this disclosure are intended to be within the scope of the invention as claimed.

What is claimed is:

1. A speed control for an electric motor of a golf car providing sequential changing between at least three separate speeds such that the golf car must accelerate through separate fixed speeds for predetermined times prior to reaching a full speed, comprising:
   a foot pedal depressable by an operator of the golf car to different extents for indicating desired relative speed;
   a plurality of switches, each of said switches being actuable in response to a predetermined extent of depression of said foot pedal, said plurality of switches generating an electrical indication of a desired relative speed;
   timing circuitry including three output conductors for carrying motor drive signals, said timing circuitry being responsive to a said electrical indication of said switches for generating a sequence of motor drive signals along said output conductors, said timing circuitry generating motor drive signals in succession at predetermined times along said output conductors in response to the extent of depression of said foot pedal for driving the motor at fixed speeds for predetermined times prior to reaching said desired relative speed; and
   motor drive means connected to said output conductors and responsive to said motor drive signals for actuating said motor at different speeds.

2. A speed control according to claim 1 for use with a golf car having an operator actuatable direction control for changing the direction of movement of the golf car, wherein said timing circuitry is responsive to actuation of the direction control, for resetting the sequence of generation of said motor drive signals to move the car beginning in a low speed to the speed indicated by said speed control.

3. A speed control according to claim 1 wherein said timing circuitry is responsive to a voltage signal for resetting the sequence of generation of said motor drive signals to move the car beginning in a low speed to the speed indicated by said speed control.

4. A speed control according to claim 1 wherein said motor drive means includes transistor switch means connected to said output conductors and responsive to said drive signals for actuating said motor at different speeds.

5. A speed control according to claim 4 wherein said motor drive means includes a plurality of solenoids responsive to actuation of said transistor switch means.

* * * * *